Aug. 25, 1925.                                                    1,550,946
G. BRAUNGART, JR., ET AL
APPARATUS FOR PRECOOLING PERISHABLE FOOD PRODUCTS
Filed May 17, 1922        3 Sheets-Sheet 3

Inventors:
George Braungart, Jr.,
and Arthur B. Hale.

By Dodge and Sons
Attorneys

Patented Aug. 25, 1925.

1,550,946

UNITED STATES PATENT OFFICE.

GEORGE BRAUNGART, JR., OF ATLANTA, GEORGIA, AND ARTHUR B. HALE, OF TAMPA, FLORIDA.

APPARATUS FOR PRECOOLING PERISHABLE FOOD PRODUCTS.

Application filed May 17, 1922. Serial No. 561,660.

*To all whom it may concern:*

Be it known that we, GEORGE BRAUNGART, Jr., and ARTHUR B. HALE, citizens of the United States, residing, respectively, at Atlanta, in the county of Fulton and State of Georgia, and at Tampa, in the county of Hillsboro and State of Florida, have invented certain new and useful Improvements in Apparatus for Precooling Perishable Food Products, of which the following is a specification.

This invention relates to apparatus for pre-cooling perishable food products, such for example as lettuce, celery, tomatoes, peaches and other farm and orchard produce not likely to be injured by moisture.

Pre-cooling has heretofore been practiced as a preliminary step to loading perishable products into refrigerator cars and the like, and is recognized as a source of great economy, particularly in the case of the more expensive fruits which are to undergo shipment for long distances Pre-cooling insures the uniform chilling of the entire carload and insures the early attaining of a sufficiently low temperature to arrest decay, and reduces the frequency with which refrigerator cars must be iced.

The use of pre-cooling has, however, been severely limited in the past because of economic considerations arising from the cost of the pre-cooling plant and the time required for the pre-cooling process.

In the prior processes, the practice is to place the products in a chill-room until they are brought to a uniform temperature of approximately 40° F. To avoid damage to the products, it is necessary that no part thereof be frozen. This precludes the use of very low temperatures in the chill-room, and, inasmuch as the specific heat of air is relatively low, the period of storage to secure the desired degree of pre-cooling is unduly long and varies from twenty-five to forty hours, according to the nature of the product, the size of the package and the temperature at which it is delivered to the pre-cooling plant.

The pre-cooling process can be accelerated somewhat by circulating the air artificially, but this practice involves some damage to many kinds of produce, as a result of the undue drying thereof.

In order to permit the commercial use of pre-cooling on a large scale with very perishable produce, it is essential to reduce the cost of the pre-cooling plant and to reduce the time required to chill the produce. This result we secure by our improved apparatus, in which the produce is chilled by direct contact with cold water. Because of the high specific heat of water, we are able to chill produce in the ordinary packages in from twenty-five to thirty-five minutes, the water being initially at a temperature of approximately 36° F. The apparatus is applicable to any goods or packages of goods which can be subjected without damage to direct contact with cold water. With many classes of produce, the spraying with water has a beneficial effect.

The preferred way of carrying out the invention is to chill the water to a point slightly above the freezing point, preferably about 36° F. by the use of any mechanical refrigerating means. The water so chilled is sprayed over the packages to be pre-cooled. In order to render the process continuous, and to minimize the handling of the packages, we prefer to feed them in succession through a chill-room by means of a suitable conveyor, the chill-room being interposed between a receiving platform and a refrigerator-car loading platform. As the packages move along the conveyor in the chill-room, they are first subjected to the spray of cold water, and are then for a short period allowed to drain in the so-called "dripping zone" within the chill-room.

The plant necessary for such pre-cooling is relatively small and inexpensive, and is continuous in operation. The use of such a plant avoids delays in shipment, reduces the amount of idle capital tied up in the produce undergoing treatment, simplifies the handling of the packages and allows the produce to be shipped in the best possible condition.

The economies which we secure enable the plant to be used in cases where the cost of prior processes is prohibitive, thus making possible the saving of enormous quantities of produce heretofore wasted. The rapidity of the process permits its use on produce so perishable that its shipment could not be delayed long enough for the carrying out of former pre-cooling processes.

In the accompanying drawings, we illustrate the preferred form of plant, though we recognize other arrangements are possible and may be preferable in particular cases.

In the drawings:—

Figure 1:
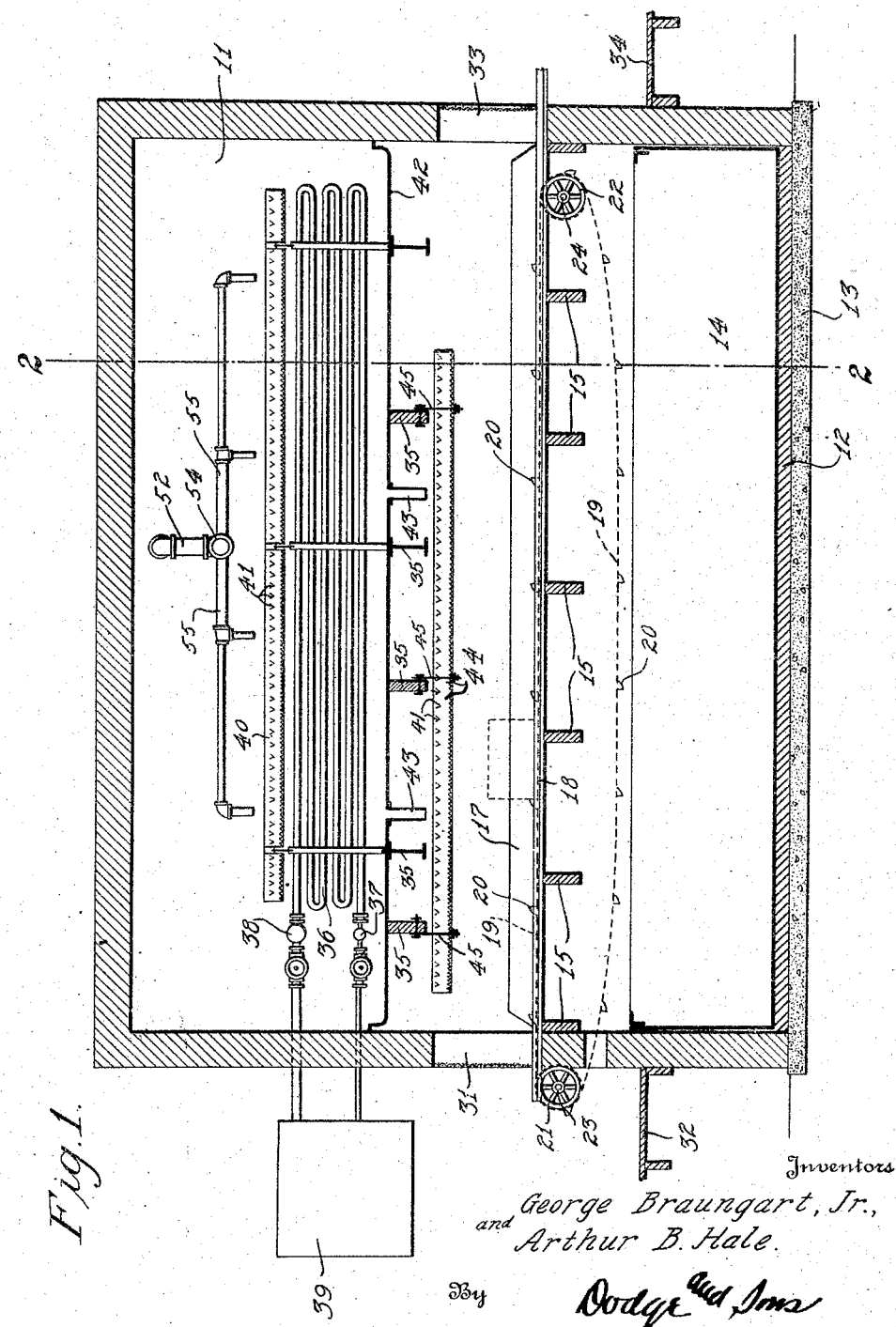
Fig. 1 is a longitudinal section through the chill-room.
Figure 2:
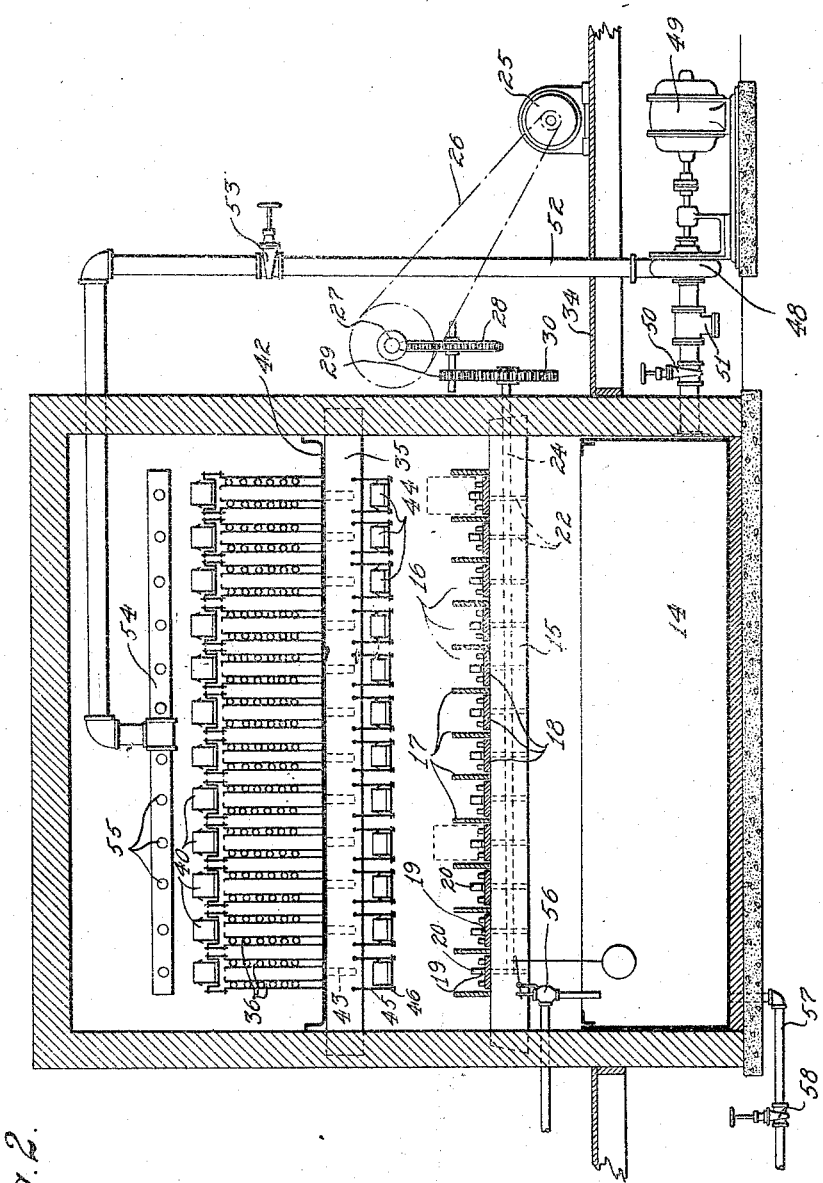
Fig. 2 is a transverse section on the line 2—2 of Fig. 1.

The cooling chamber 11 is a suitable insulated room of proper size. Resting on an insulated floor 12, supported by the foundation 13, is a large water tank or basin 14. Supported above the tank on the sills 15 are a plurality of longitudinally extending skidways 16 separated from each other by upstanding guides or partitions 17. In the middle of each skid-way 16 is a guide 18 for a conveyor chain 19, there being one conveyor chain for each skid-way, and each chain being provided with a series of spaced flights or lugs 20. Each chain runs over a corresponding pair of sprockets 21 and 22, the sprockets 21 being mounted freely on the shaft 23, and the sprockets 22 being fast upon the shaft 24. The shaft 24 is driven by a variable speed motor 25 through a reduction train consisting of the sprocket chain 26, worm 27, worm-wheel 28 and gears 29 and 30.

The cooling chamber 11 is provided with a series of inlet doors adjacent the receiving platform 32, there being an inlet door 31 for each skid-way. Similarly the chamber is provided at its opposite end with a series of discharge doors 33, one for each skid-way. These doors 33 discharge the chilled packages to the loading platform 34 which is the ordinary loading platform from which the goods are handled into the refrigerator cars. The inlet doors 31 and the discharge doors 33 are provided with individual canvas curtains, as indicated in the drawings, this being a familiar expedient to prevent air circulation through the chill-room. The conveyor chains and flights move freely beneath the lower edges of the curtains.

Mounted above the sills 15 is a second series of sills 35 upon which are mounted the refrigerating coils 36. These refrigerating coils may be of any known type, but we have chosen for illustration water-cooling coils of the so-called "Baudelot" type. These are mounted with the usual stands, headers, valves and other fittings, and are connected by the usual pipe lines to any standard mechanical refrigerating equipment. The expansion valve is shown at 37 and the suction valve at 38, and the mechanical refrigerating plant is indicated generally and diagrammatically at 39.

Figure 3:
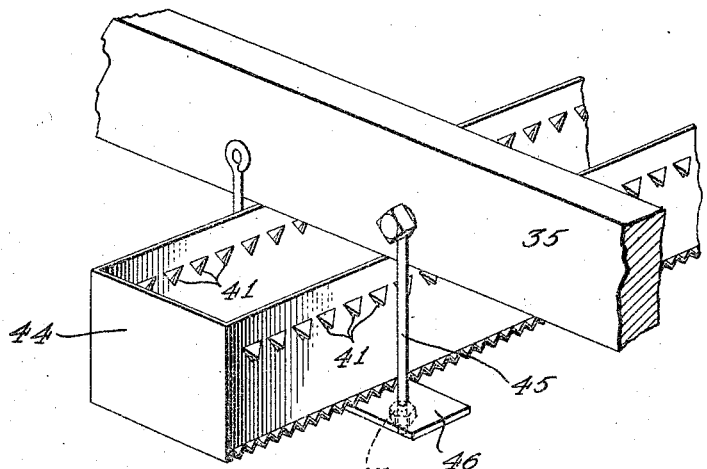
Fig. 3 is a perspective view showing a portion of one of the dripping troughs and the mode of supporting the same.

Mounted above the coils 36 are a series of drip troughs 40 which are supported on the framework which carries the coils. The form of these troughs, though not the manner of supporting them, is shown clearly in Fig. 3, the troughs being rectangular in cross-section and formed with V notches 41 in their sides which leave small tongues struck outward from the sides of the troughs. These pointed tongues, together with the saw-toothed edges which are formed along each lower corner of the trough, serve as drip points from which the water escaping through the V notches 41 falls into fine rain or spray.

The drip troughs 40 extend throughout the lengths of the coils 36 and parallel thereto, and the troughs conjointly operate to spray water over the entire nest of coils 36. This water, chilled by its flow over the coils, is collected in a shallow basin 42, also supported on the sills 35. The water collected in the basin 42 is fed by the discharge pipes 43 to a second series of drip troughs 44 which are sustained from the sills 35 by means of the threaded hangers 45 which adjustably support the bearer pieces 46 by means of the nuts 47. This construction allows the troughs to be alined and leveled to meet conditions. (See Fig. 3.)

The drip troughs 44 extend longitudinally, there being in the construction shown one drip trough for each skid-way, so that each of the lower drip troughs serves to spray the chilled water upon the material moved along a skid-way by the conveyor chain. The lower series of troughs does not extend the full length of the conveyor skid-way, but each trough terminates a substantial distance from the corresponding discharge door-way 33 to leave a short dripping zone in which the packages lose excess moisture. The water so sprayed over the cooling coils, and then over the conveyor ways, is drawn from the tank 14 by means of a centrifugal pump 48 driven by a variable speed motor 49 or in other suitable manner.

Interposed between the tank and the suction of the pump are gate valve 50 and a strainer 51. By closing the valve 50, the strainer 51 can be cleaned. The pump discharges through a pipe 52 and gate valve 53 to a header 54 from which branch a number of small discharge pipes 55. These are arranged over the upper drip troughs 40 and discharge directly into them.

Inasmuch as there are likely to be some losses of water from the tank 14 for various reasons, chiefly the fact that the packages will take some moisture with them as they leave the cooling zone, it is necessary to make progressive additions of water to the tank 14, and this is accomplished by a constant level float valve 56. The tank 14 may be drained upon occasion through a discharge connection 57 controlled by the gate valve 58.

Figure 4:
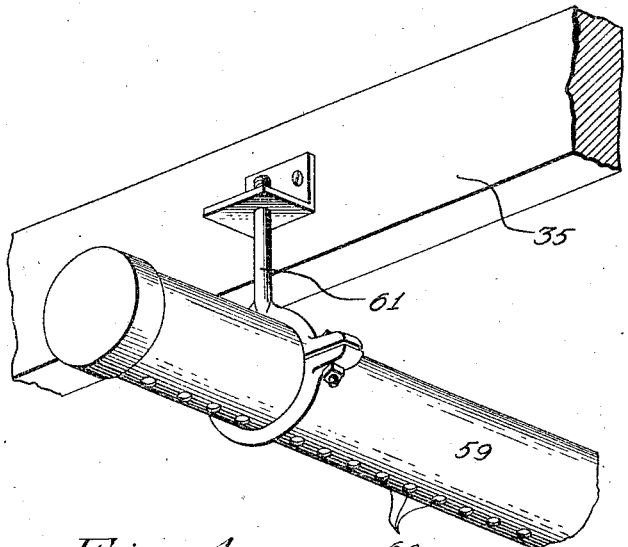
Fig. 4 is a view similar to Fig. 3 showing a spray pipe substituted for the dripping trough.

For either series of drip troughs, it is possible to substitute spray pipes, and this arrangement as applied to the lower series of troughs is indicated in perspective in Fig. 4. In this case, the spray pipe 59, provided with apertures 60, is sustained by pipe hangers 61 from the sills 35. In such case, the spray pipe would be connected directly to the basin 42, as will be obvious to those skilled in the art.

While the construction above described has been found to give good results in actual use, we recognize that it is only one of many embodiments of the inventive idea, and we do not imply any limitation to the specific structure shown.

In its broadest aspects, the invention involves the provision of a supply of chilled water and the direct application of that water to the goods to be pre-cooled. Various ways of chilling water are known to those skilled in the art of refrigeration, and we contemplate the use of any water-chilling means which may be found best suited to the local conditions. The particular water-cooling means chosen for illustration is one of many which are familiar to those skilled in the art, and it is selected for purposes of illustration, as a satisfactory type.

Similarly the particular conveyor structure is a familiar type of flight conveyor which is a standard article of commerce but the one illustrated is, we believe, best suited to this particular problem. Other types of conveyor obviously can be used.

The application of the chilled water to the packages by spraying is believed to be the best way of applying water to the goods because it secures even and penetrating distribution of water without destruction impact, and without the consumption of much power. The use of a relatively large basin or tank 14 steadies the action of the device and gives a certain reserve of chilled water which will allow the chill-room to remain in operation even though the operation of the mechanical refrigerating device be suspended for brief periods.

The variable speed drives provided for the conveyor and for the water circulating pump are important features of the invention. The first enables one to vary the duration of chilling treatment to conform to the nature of the goods being treated, the size of the packages and the entering temperature of the goods. The variable speed drive for the pump and the valve 53 on the discharge pipe offer convenient means for varying the circulation rate of the water to permit this to be properly coordinated with the refrigerating effect of the coils 36 and the rate the heat is being abstracted from the goods undergoing treatment.

In other words, the plant is provided with such adjustments as will permit its action to be controlled to secure the proper coordination of the refrigerating coils, the rate of water circulation and rate of travel of the treated goods. This will insure the desired degree of pre-cooling, the complete pre-cooling of each package and a high thermal efficiency of the refrigerating plant.

To put the device into operation, the refrigerating plant is started up and the water circulation pump is started, and the plant is operated until the water in the tank 14 reaches a sufficiently low temperature to insure the proper pre-cooling action. When this condition has been reached, the packages to be treated are fed to the conveyors through the doors 31 and progress longitudinally through the chill-room propelled along the various skid-ways by the lugs or flights on the conveyor chains.

As the packages move down the skidways, they are continuously sprayed by water falling from the lower series of drip troughs, and the device is so operated that this sprayed water is at or near 36° F.

The chain is driven at such speed, with reference to the entering temperature of the packages, their size and the nature of the produce contained in the package, that the packages will be discharged by the conveyors after passing through the spraying zone and the dripping zone at a temperature of approximately 40° F. The packages so chilled are immediately loaded into the refrigerating cars. The use of relatively open containers, such as slatted crates, hampers or the like, is contemplated in the case of most forms of produce.

As stated, the average time required for the desired pre-cooling varies from twenty-five to thirty-five minutes. This means that a relatively small refrigerating plant can be used, and that the shipment of the goods is not delayed appreciably. In fact, it is possible to pre-cool and ship produce the day it is picked and packed, a feature of the utmost importance in the case of highly perishable products which cannot be shipped to distant markets successfully even by the use of prior pre-cooling processes.

Consequently, the invention not only extends the range of economic utility of pre-cooling processes, but enables the use of pre-cooling on produce which never could heretofore be successfully pre-cooled because of the long time required by prior processes.

It is possible, by careful proportioning of the chill-room, to reduce radiation losses to a minimum, a condition which is favored by the location of all the cooling mechanism within a single insulated chamber. The use of a relatively small mechanical refrigerating plant is favored by the relatively large size of the basin 14, because the accumulation of the large volume of water cooled nearly to the desired chilling temperature takes care of peak loads and short shutdowns of either the mechanical refrigerating plant or the conveyors, and these features particularly are important from the apparatus standpoint.

What is claimed is:—

1. In a pre-cooling plant, the combination of a closed insulated chamber; a water reservoir in the lower portion of said chamber; a water-chilling means mounted in said chamber; a water-circulating mechanism for drawing water from said reservoir and feeding it to said water-chilling means; a water spraying device serving to receive water from said water-chilling means and to spray it within said chamber and into said reservoir; and a conveyor serving to carry packages through said chamber in the path of said sprayed water.

2. In a pre-cooling plant, the combination of a closed heat-insulating chamber; a water reservoir in the lower portion of said chamber; a combined water-chilling and spraying means serving to withdraw water from said reservoir and return it thereto in the form of spray at a temperature slightly above the freezing point of water, said spraying means extending only a portion of the length of said chamber; and a conveyor extending through said chamber and serving to propel packages first through the spray and then through a portion of said chamber beyond the action of said spraying device, whereby the sprayed packages are allowed to drain before being discharged from said chamber.

In testimony whereof we have signed our names to this specification.

GEORGE BRAUNGART, Jr.
ARTHUR B. HALE.